UNITED STATES PATENT OFFICE.

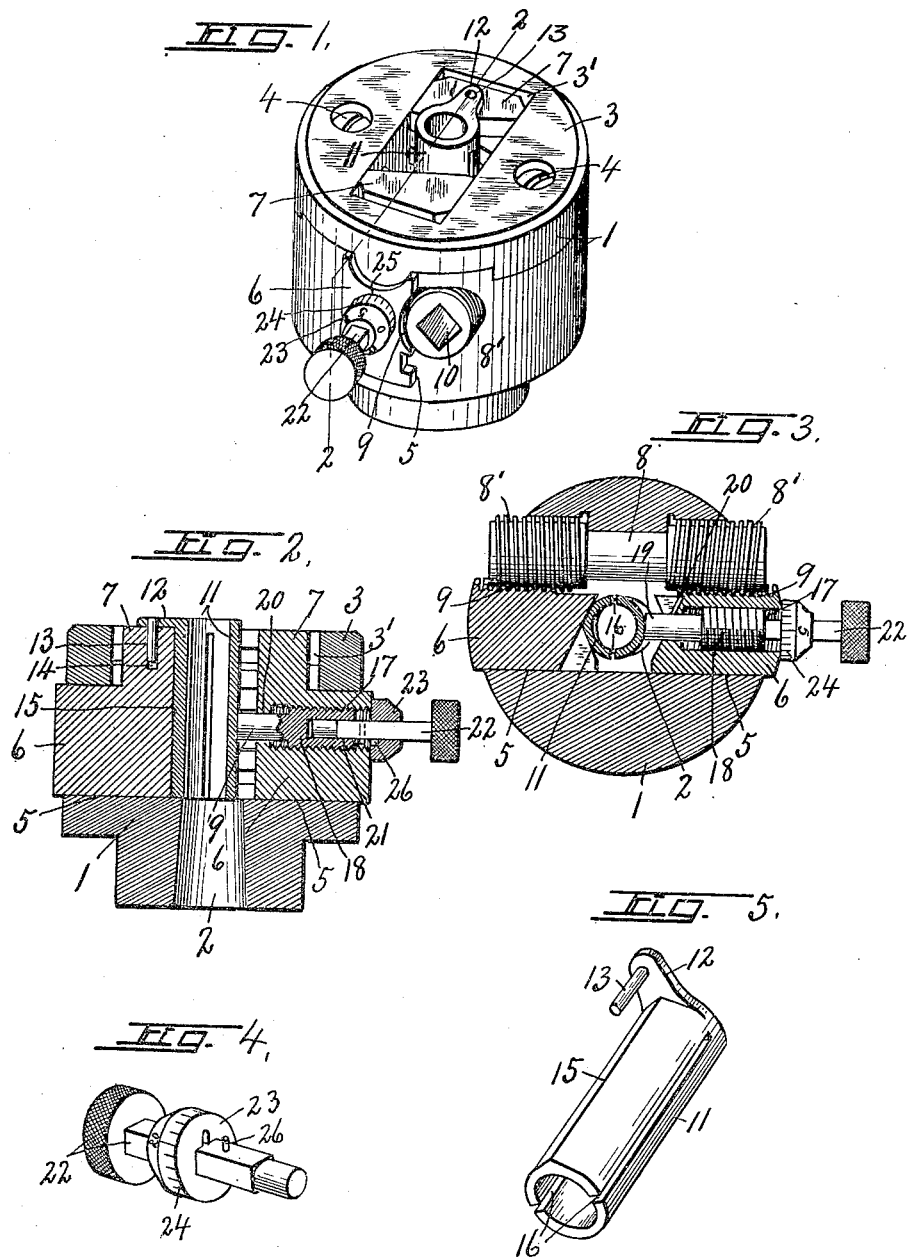

JAMES CARR, OF SYRACUSE, NEW YORK, ASSIGNOR TO MARVIN & CASLER COMPANY, OF CANASTOTA, NEW YORK, A CORPORATION OF NEW YORK.

DRILL-CHUCK.

1,125,650. Specification of Letters Patent. Patented Jan. 19, 1915.

Application filed April 9, 1914. Serial No. 830,609.

*To all whom it may concern:*

Be it known that I, JAMES CARR, a citizen of the United States, residing at Syracuse, in the county of Onondaga and State of New York, have invented new and useful Improvements in Drill-Chucks, of which the following, taken in connection with the accompanying drawings, is a full, clear, and exact description.

This invention relates to certain improvements in drill chucks of the class set forth in my pending application Serial No. 800,934, filed November 14, 1913, and refers more particularly to means for centering and decentering the drill or other object which may grip between the jaws.

The main object is to enable the drill or other object to be shifted with one of the jaws toward and from the axis of the chuck ready for clamping in any of its adjusted positions by the decentering screw.

Another object is to provide the turning means for the screw with additional means for indicating the amount of adjustment of the drill off center or to one side of the axis of the chuck.

Other objects and uses relating to specific parts of the drill chuck will be brought out in the following description.

In the drawings—Figure 1 is a perspective view of a drill chuck embodying the various features of my invention. Fig. 2 is a central vertical sectional view of the same chuck taken on line 2—2, Fig. 1. Fig. 3 is a horizontal sectional view in the plane of the adjusting and decentering screws. Fig. 4 is a perspective view of the key for turning the decentering screw and gage mounted thereon for indicating the amount of movement of the drill off center. Fig. 5 is a perspective view of the detached drill holder.

This drill chuck comprises a cylindrical head —1— having a tapering socket —2— in one end for receiving the tapering end of the drill spindle with a friction fit, the opposite end of the head being provided with a removable cap or collar —3— which is secured to the main body by screws —4— shown in Fig. 1.

The head —1— is provided with diametrically opposite radial ways —5— for receiving and guiding a pair of radially movable jaws —6— having their inner ends provided with axially extending flanges —7— which are movable in a lengthwise slot —3'— in the cap —3— to additionally guide the jaws in their radial movement and prevent their radial displacement. A screw spindle —8— is journaled in the head at one side of the jaws and its opposite ends are provided with threads —8'— of opposite pitch, each engaging threads —9— in the adjacent faces of the jaws so that by turning the spindle in one direction or the other, the jaws will be simultaneously moved in reverse directions, one or both ends of the spindle being provided with a socket —10— of angular cross section for receiving a wrench by which the screw spindle —8— may be turned, it being understood that both ends of said spindle extend to the periphery of the head of the chuck.

The gripping faces of the jaws —6— are preferably V-shaped and provided with teeth and spaces alternating with each other, the teeth of one jaw being adapted to enter the spaces in the adjacent jaw so that the bases of the V-shaped gripping faces may be brought into close juxta-position for gripping large or small objects.

A split sleeve —11— is detachably mounted upon one of the jaws —6— to move radially therewith and for this purpose is provided with a laterally projecting flange —12— having a pin —13— in sliding interlocking engagement with the socket —14— in the drill-end of the head, the main body of the sleeve being extended axially of the head transversely of the ways —5— and in close juxta-position to the inner gripping faces of said jaw, the side of the sleeve adjacent the jaw being provided with a V-shaped rib —15— adapted to fit closely in the V-shaped groove in said jaw to hold the sleeve against lateral movement relatively to the direction of movement of the jaws. The pin —13—, therefore, locks the sleeve to the jaw to move therewith toward and from the center of the chuck and, of course, toward and from the other jaw, said sleeve being provided with longitudinal slots —16— to allow it to be compressed upon the drill (not shown) for holding said drill in operative position against displacement while the jaw carrying the sleeve —11— is adjusted radially.

The object of the sliding interlocking connection between the sleeve and jaw is to permit such sleeve to be easily and quickly withdrawn and replaced by other sleeves having different sized bores for receiving drills of different sizes within a certain range, thereby obviating the necessity for carrying in stock a large number of sleeves.

The jaw —6— opposite to the one to which the sleeve is connected is provided with a radially threaded socket —17— with which is engaged a radially adjustable decentering screw —18— having a reduced inner end —19— guided in a corresponding aperture —20— in the inner face of said jaw to engage the adjacent side of the sleeve —11— for tightening or compressing it upon the shank of the drill and thereby firmly holding said drill against turning in the sleeve during the drilling operation. The outer end of the decentering screw —18— is provided with a socket —21— of angular cross section for receiving a key —22— by which the screw may be turned, said key being slidable in the socket to allow the screw to move relatively thereto.

Slidably mounted on the key is a collar —23— having graduations —24— on its periphery adapted to register with a mark —25— on the adjacent face of the jaw —6— to indicate the degree of adjustment of the drill off center, the key —22— being provided with a stop pin —26— just at the inner end of the collar —23— adapted to enter a recess in said collar for the purpose of holding the latter against endwise displacement from the key when such key is withdrawn.

The diameter of the sleeve —11— is preferably such that when the decentering screw —18— is withdrawn from the inner face of the corresponding jaw and such jaw is brought up tightly against the adjacent face of the sleeve, the axis of the sleeve will be in substantial coincidence with that of the chuck although such condition is not necessary.

If it is desired to hold the drill exactly co-axial with the axis of the chuck, the sleeve —11— may be withdrawn and the drill engaged directly by the jaws of the chuck.

What I claim is:

1. In a drill-chuck, a head, jaws guided on the head, means for moving said jaws radially in opposite directions, a tool-holder carried by one of the jaws to move therewith, and means on the other jaw to tighten the tool-holder on a tool.

2. In a drill-chuck, a head, jaws guided on the head, means for moving said jaws radially in opposite directions, a work-holder having sliding interlocking connections with one of the jaws to move radially therewith, and means for tightening the workholder upon the work.

3. In a drill-chuck, a head, jaws guided on the head, means for moving said jaws radially in opposite directions, a split sleeve carried by one of the jaws to receive and hold a tool, and means on the other jaw for compressing the sleeve upon such tool.

4. In a drill-chuck, a head, jaws guided on the head, means for moving said jaws radially in opposite directions, a tool-holder, means for holding the tool-holder in engagement with the gripping face of one of the jaws so as to move therewith, and means on the other jaw for tightening the toolholder upon a tool.

5. In a drill-chuck, a head, jaws guided on the head, means for moving said jaws radially in opposite directions, a split sleeve, means for holding said sleeve in engagement with the gripping face of one of the jaws, and means on the other jaw for compressing the sleeve.

6. A drill chuck comprising a head, radially movable jaws therein, a screw adjustable radially through one of the jaws for decentering a drill, a key for turning the screw, and means on the key for indicating the amount of such adjustment.

7. A drill chuck comprising a head, radially movable jaws therein, a screw adjustable radially through one of the jaws for decentering a drill, a key for turning the screw, and a graduated collar splined on the key to indicate the amount of such adjustment.

In witness whereof I have hereunto set my hand this 31st day of March, 1914.

JAMES CARR.

Witnesses:
H. E. CHASE,
EVA E. GREENLEAF.